(12) United States Patent
Barkus et al.

(10) Patent No.: US 12,346,676 B2
(45) Date of Patent: Jul. 1, 2025

(54) SYSTEM AND METHOD FOR MANAGING SOFTWARE APPLICATION CURRENCY

(71) Applicant: METROPOLITAN LIFE INSURANCE CO., New York, NY (US)

(72) Inventors: Amanda Barkus, Apex, NC (US); Nicole Ann Chiantello, Lakewood, CO (US)

(73) Assignee: METROPOLITAN LIFE ISURANCE CO., New York, NY (US)

( * ) Notice: Subject to any disclaimer, the term of this patent is extended or adjusted under 35 U.S.C. 154(b) by 157 days.

(21) Appl. No.: 17/029,732

(22) Filed: Sep. 23, 2020

(65) Prior Publication Data
US 2021/0089286 A1 Mar. 25, 2021

Related U.S. Application Data

(60) Provisional application No. 62/905,674, filed on Sep. 25, 2019.

(51) Int. Cl.
G06F 9/44 (2018.01)
G06F 8/41 (2018.01)
G06F 8/65 (2018.01)
G06F 8/71 (2018.01)

(52) U.S. Cl.
CPC ............... *G06F 8/433* (2013.01); *G06F 8/65* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 8,863,114 B2* | 10/2014 | Shah | G06F 8/60 717/175 |
| 2006/0031827 A1* | 2/2006 | Barfield | G06F 8/65 717/168 |
| 2011/0055811 A1* | 3/2011 | Ananthanarayanan | G06F 9/44536 717/120 |
| 2015/0113517 A1* | 4/2015 | Bennah | G06F 3/1204 717/170 |
| 2016/0335075 A1* | 11/2016 | Mahajan | H04L 67/34 |
| 2018/0011700 A1* | 1/2018 | Plate | G06F 8/65 |

* cited by examiner

*Primary Examiner* — Bradley A Teets
*Assistant Examiner* — Lanny N Ung
(74) *Attorney, Agent, or Firm* — Polsinelli

(57) ABSTRACT

Source code files of software applications are scanned or searched to identify dependency information, such as versions of linked or embedded libraries. The dependency information is aggregated from the software applications, and displayed in a graphical user interface that is accessible by a user via web access. The dependency information can be used to prioritize upgrades, maintenance and management of the software applications, such as by prioritizing the update of software applications having older versions of libraries.

18 Claims, 17 Drawing Sheets

Scanned

| Name | Category | Notes | Company | Version | Family | Vendor? | Current? | Last Updated | Last Updated by | URL |
|---|---|---|---|---|---|---|---|---|---|---|
| ANTLR | Development Tool/Utility/IDE | | ANTLR | 3.7.7 | | No | No | 8/10/2016 12:00:00 AM | METNET\vjm1 | |
| Apache Axis | File Manipulation Utility | | Apache Software Foundation | 1 | | No | No | 8/10/2016 12:00:00 AM | METNET\vjm1 | |
| Apache Commons-Resources | App Framework/Platform Framework | | Apache Software Foundation | 1.7 | | No | No | 8/10/2016 12:00:00 AM | METNET\vjm1 | |

Non-scanned

| Name | Category | Notes | Company | Version | Family | Vendor? | Current? | Last Updated | Last Updated by |
|---|---|---|---|---|---|---|---|---|---|
| AIX | Operating System | | IBM | 6.1 | | | No | 8/10/2016 12:00:00 AM | METNET\vjm1 |
| Apache Commons-JXPath | App Framework/Platform Framework | | Apache Software Foundation | 1.1 | | | No | 8/10/2016 12:00:00 AM | METNET\vjm1 |
| DB2 UDB Enterprise Edition | Database | | IBM | 9.1 | | | No | 8/10/2016 12:00:00 AM | METNET\vjm1 |

FIG. 5

| log4j-core.jar, Version=1.1.3 | 1.1.3 | 1.1.3 | "Apache Software Foundation" | java | "Apache Software Foundation" | Match ✗ |

FIG. 6

Match Dependencies

Name: log4j-core.jar, Version=1.1.3
Company: "Apache Software Foundation"
Version: 1.1.3

Search: [log4j] [✗] [Search]

Create Issue
All products:
Apache Log4j, Version=1.0
Apache Log4j, Version=1.1
Apache Log4j, Version=1.1.3

| Full Name | Product Version | File Version | Comments | Runtime | Company | URL | Link |
|---|---|---|---|---|---|---|---|
| commons-collections-2.1.1.jar, version=2.1.1 | 2.1.1 | | | Java | Apache Software Foundation | | Match |

SYSTEM AND METHOD FOR MANAGING SOFTWARE APPLICATION CURRENCY

CROSS-REFERENCE TO RELATED APPLICATION

This application claims the benefit of, and priority to, U.S. Provisional Patent Application No. 62/905,674, filed Sep. 25, 2019, entitled CURRENCY SCANNING PROCESS, the full disclosure of which is incorporated herein by reference in its entirety.

FIELD OF THE INVENTION

The techniques described herein are directed to systems and methods that can be used to monitor and manage the currency of software applications. In particular, the systems and methods are directed to identifying dependencies in software applications, identifying the relationship of the products and technologies that are used in software applications, and providing an interface that can be used to manage the currency of the underlying software applications.

BACKGROUND

Existing application scanning tools often face lifecycle and coverage challenges. For example, some existing application scanning tools fail to provide full application coverage. More specifically, they fail to accurately identify a significant number of applications on a system.

It is desirable to have an application scanning tool with expanded application coverage. There is also a need for a management tool that allows a user to view scan results, maintain an active record of applications across portfolios, unify applications with common names, and track upgrades of the applications. Select embodiments of the disclosed technology address these needs.

SUMMARY

The disclosed technology relates to systems and methods for managing software application currency. The system and method identify a first group from a plurality of software applications, where that first group is subject to currency management. The system and method identify a second group from the plurality of software applications, where that second group is not subject to currency management. For a first software application in the first group, the system and method identify a first dependency by using at least a source code repository corresponding to the first software application. The system and method determine that a first version corresponds to the first dependency, and determine that a second version corresponding to the first dependency is more current than the first version. The system and method identify the first software application for a currency update, based at least on the second version being more current than the first version.

In other aspects, the system and method identify a second dependency for a second application of the first group by using at least a source code repository corresponding to the second application. The system and method determine that the first dependency and the second dependency are the same dependency. The system and method determine that a third version corresponds to the second dependency, and that the third version corresponding to the second dependency is less current than the first version. The system and method identify the second software application as a higher priority for the currency update than the first software application, based at least on the third version being less current than the first version.

In other aspects, the system and method display information representing the first software application, the second software application, the first version corresponding to the first dependency, the second version corresponding to the first dependency, the third version corresponding to the second dependency, a priority for currency update of the first software application, and a priority for currency update of the second software application.

In other aspects, the system and method identify all dependencies for the first software application of the first group by using at least the source code repository corresponding to the first software application. The system and method determine all versions corresponding to all the dependencies, and the system and method display information representing all the versions and all the dependencies.

In other aspects, the system and method identify a total number of dependencies for the first software application of the first group by using at least the source code repository corresponding to the first software application. The system and method display information representing the total number of dependencies for the first software application.

In other aspects, the system and method identify a total number of software applications having a first version that corresponds to the first dependency for the first group of the plurality of software applications. The system and method display information representing the total number of software applications in the first group having the first version that corresponds to the first dependency.

In other aspects, the system and method identify a total number of software applications having the first dependency for the first group of the plurality of software applications. The system and method display information representing the total number of software applications in the first group having the first dependency.

In other aspects, the system and method identify names of all the software applications having the first dependency for the first group of the plurality of software applications. The system and method display information representing the names of all the software applications having the first dependency.

In other aspects, the system and method identify names of software applications in the second group having the first dependency for the second group of the plurality of software applications, by using at least source code repositories. The system and method display information representing the names of the software applications in the second group having the first dependency. The system and method display an option to change the identification of the software applications in the second group having the first dependency from the second group where they are not subject to currency management to the first group where they are subject to currency management.

In other aspects, the system and method identify names of software applications in the second group having the first dependency for the second group of the plurality of software applications, by using at least metadata associated with the software applications in the second group. The system and method display information representing the names of the software applications in the second group having the first dependency. The system and method display an option to change the identification of the software applications in the second group having the first dependency from the second group where they are not subject to currency management to the first group where they are subject to currency management.

In other aspects, the system and method identify third dependencies of a second software application that is not in either the first group or the second group, by using at least a source code repository corresponding to the second software application. The system and method determine that the first dependency corresponds to one of the third dependencies, and display information representing the third dependencies and respective versions.

Various aspects of the described illustrative embodiments may be combined with aspects of certain other embodiments to realize yet further combinations. It is to be understood that one or more features of any one illustration may be combined with one or more features of the other arrangements disclosed.

BRIEF DESCRIPTION OF THE DRAWINGS

The following Detailed Description of the technology is better understood when read in conjunction with the appended drawings. For the purposes of illustration, there are shown in the drawings exemplary embodiments, but the subject matter is not limited to the specific elements and instrumentalities disclosed. Components in the figures are shown for illustration purposes only, and may not be drawn to scale.

FIG. 5 illustrates an example graphical user interface displaying scanned and non-scanned application breakdown according to one aspect of the disclosed technology;

FIG. 6 illustrates an example of one product information displayed in the graphical user interface according to one aspect of the disclosed technology;

FIG. 7 illustrates an example "Match Dependencies" page displayed in the graphical user interface according to one aspect of the disclosed technology;

FIG. 8 illustrates an example graphical user interface displaying information for linking according to one aspect of the disclosed technology;

FIG. 9 illustrates an example graphical user interface displaying information for verification according to one aspect of the disclosed technology;

FIG. 10 illustrates an example "Scans" tab in the graphical user interface illustrating an inventory of and links to all scans that have been performed against a specific application according to one aspect of the disclosed technology;

FIG. 11 illustrates example scan results shown in the graphical user interface according to one aspect of the disclosed technology;

FIG. 12 illustrates an example product in the scan results with a "Match" button shown in the graphical user interface according to one aspect of the disclosed technology;

FIG. 13 illustrates an example "Match Dependencies" page presented in the graphical user interface according to one aspect of the disclosed technology;

FIG. 15 illustrates a "Link" button shown in the "Match Dependencies" page according to one aspect of the disclosed technology;

FIG. 16 illustrates a "View" button shown in the graphical user interface according to one aspect of the disclosed technology;

FIG. 17 illustrates an example "Product Currency" tab in the graphical user interface according to one aspect of the disclosed technology;

DETAILED DESCRIPTION

Figure 1:
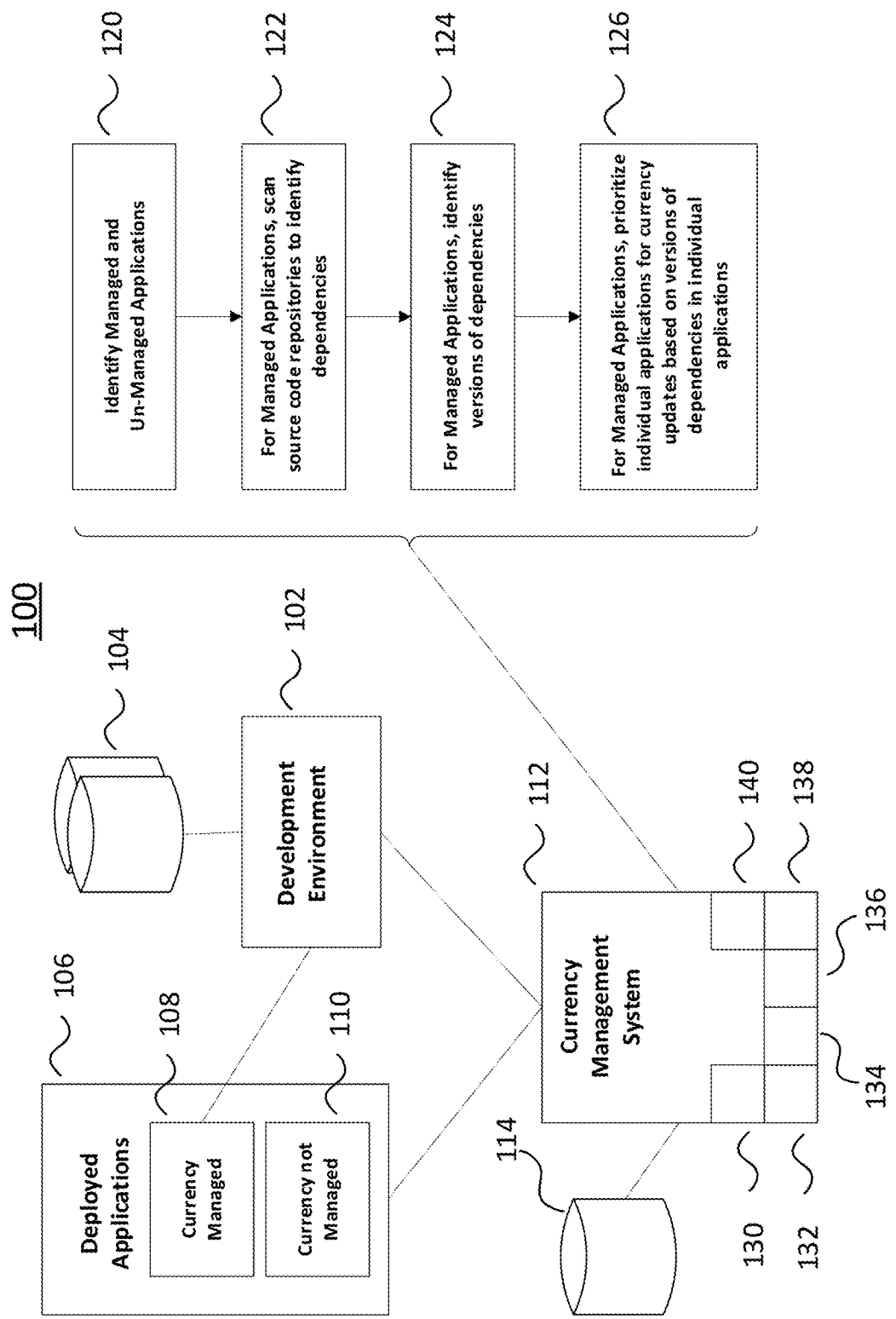
FIG. 1 illustrates a system and steps in a method according to one aspect of the disclosed technology.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Essentially all software applications are created with some original source code for certain functions and features, and then libraries or modules for source code that has already been written and debugged are included or referred. These included or referred libraries or modules can be used to accomplish more routine functions or features. In this way, the developer can focus on the new features and functions, without the need to draft new source code from scratch for the rest. For example, a set of library functions may be available to handle input and output to a database or for display of data, and the developer can take advantage of those library functions by including or embedding the libraries in the newly created source code. Different programming languages accomplish this with standard statements, such as "Include xxx" where xxx is the file name of the library that is being referred to.

Software developers usually create, debug and maintain/manage the source code for a project in a development environment, which is typically called an Integrated Development Environment ("IDE"). IDE's are available for the common program languages, including JAVA, C, Python, and MICROSOFT'S .NET framework. The IDE includes both the source code under development, and the source code or links for the standard libraries that a developer may decide to include. Those standard libraries are generally not static, and they are updated over time with new features, and/or to address security issues. In this way, a standard library might have multiple available versions that can be included, and the developer can select the particular version of a library that they want to include in their project. The different versions can be identified by having different file names corresponding to the different versions, or by their location in different file folders or locations corresponding to the different versions.

Working within the IDE, it is possible to determine which particular library has been included in the source code for a project. This can be done by opening the project source code files and searching for keywords, such as "Include" and then keeping a list of all the libraries that have been included. It is also possible that a library also refers to another library, so it may be necessary to open many of the library source code files as well. That manual process may be slow, but it can identify all the libraries used, included or called by a project, and the versions of those respective libraries.

An operating system, such as MICROSOFT WINDOWS, LINUX and APPLE OS X also has source code, but the source code may not be provided with the program. Instead, the customer gets executable files. For an open source operating system like LINUX, it is possible for almost anyone to determine which libraries are called and included in the operating system. For closed operating systems, like WINDOWS and OS X, a customer would generally not be able to determine which libraries are called and included in the operating system. Similarly, for standard applications, like word processors, data base managers, e-mail applications, contact managers, etc., a customer would generally not be able to determine which libraries are called and included, unless the applications are open source. For operating systems and standard applications, the customers get executable files, and the companies that sell the products are responsible for maintaining and managing the operating system or application.

Beyond the operating system and the standard applications, companies may need software applications that are specifically developed for them or for their particular market. Depending on the company size and how extensive the market might be, those specialized software applications may be developed in-house, or they may be developed or customized under contract for the company. When developed in-house, the programmers might be employees or independent contractors, and the IDE with associated source code files is usually under the control of the company itself. In this way, the company has ready access to the source code files.

When source code is developed by a third party under contract to a company, it is very typical that the developer provides and maintains copies of the IDE with the underlying source code specifically for the benefit of the company. This helps mitigate risk for maintenance and management of the source code, in the event that the developer or programmers go out of business. In this arrangement the contractor would typically manage and maintain the application, under direction from the company, and the company would have access to the IDE or maybe a copy of the IDE.

The systems and methods described herein have particular utility for source code that is developed under contract, but it also has utility for in-house developed source code. Like the libraries that might be included, the source code for an application must also be maintained and managed. For example, a security risk might be exposed in a particular version of a library. A company that has a number of specialized software applications, individually developed and deployed at different times to address particular needs, may find it unduly time consuming to search all of those specialized software applications to determine whether any of them are using the particular version of that library that is at risk. In addition, a company that has a number of specialized software applications will usually want to prioritize the resources that are needed to update those individual specialized software applications. One way to prioritize is by knowing which library versions are used in each of the individual specialized software applications, and then focusing resources to update the software applications having the oldest versions. Another way to prioritize is by the type of dependency. As an example, if the dependency is related to a security framework, then that security dependency might have a higher priority.

Referring to FIG. 1, a system 100 includes an IDE 102, where software developers can write, save, develop, manage and maintain the source code. The IDE 102 includes code storage 104, where the source code and libraries that are included in the source code are stored. The IDE may reside on stand-alone computer systems, or they may be networked with other systems. Although not illustrated, the IDE includes servers, clients, processors, memory, user interfaces and network interfaces. When software development has reached the point where the application is ready to be deployed and used in the customer environment, the source code is compiled or otherwise made executable, and the executable files are loaded into a production environment where the application is exposed beyond the development environment. Those executable files run on servers and clients, and make use of storage in the deployed environment 106. In the deployed environment, the servers and clients include processors and memory and they are usually networked, and include user interfaces.

In the deployed environment 106, there are software applications that need to be currency managed 108, and software applications that do not need to be currency managed 110. The software applications that do not need to be currency managed might include the operating system components, as well as standard applications (word processors, data base managers, e-mail applications, contact managers, etc.). The software applications that are currency managed might include the in-house developed software, as well as software that is developed under contract for the company by third-parties. The IDE for software that is developed under contract for the company by third-parties might be part of development environment 102.

The system for currency management 112 takes advantage of the development environment 102 and the deployed environment 106. A database or file is used to track which software applications are subject to currency management 108, and which software applications are not subject to currency management 110. That information is saved in storage 114. The system for currency management 112 includes servers 130, clients 132, user interfaces 134, and network interfaces 136, with associated processors 138 and memory 140. The process of identifying the applications that are and are not subject to currency management is represented by step 120 in FIG. 1.

At step 122, the source code files for managed applications are scanned by system 100 to identify dependencies. This may include searches for key words, such as "Include" or other terms that may be associated with dependencies.

At step 124, the versions of the dependencies or libraries are identified. In most instances, versions are sequentially numbered, and a more current version of a dependency will have a higher number. As an example version 1.2.2 of a library would typically be more current or newer than version 1.2.1.

The process illustrated in steps 122 and 124 are repeated by system 100 for other managed applications, and the various versions of the dependencies are identified. From those various versions of the dependencies, it is possible to determine which version of a dependency is used in the different software applications. As an example, one managed software application, which is used to track employee cross-selling credits, might use version 1.5.5 of a database query library. Another managed software application, which is used to track employee maternity leave, might use version 1.6.5 of that same database query library. At step 126, it is possible for system 100 to prioritize updates of the software application that is used to track employee cross-selling credits over the software application that is used to track employee maternity leave, based on the different versions of the database query library that are used in each application.

The process described and illustrated in steps 120-126 can be performed on a routine basis, or the steps can be performed based on some external trigger, such as notification of a security risk in a particular library.

The software code to perform steps 120-126 can be almost any language that is able to access and parse source code files. Where a company has a number of managed applications in one particular programming language, such as JAVA, it may be advantageous to also use JAVA for the software code to perform steps 120-126. If the company uses .NET, then it may be advantageous to also use .NET for the software code to perform steps 120-126. Regardless of what language is used for the software code to perform steps 120-126, it can be helpful to combine all the results so that priorities can be established across all the applications in a company.

Figure 2:
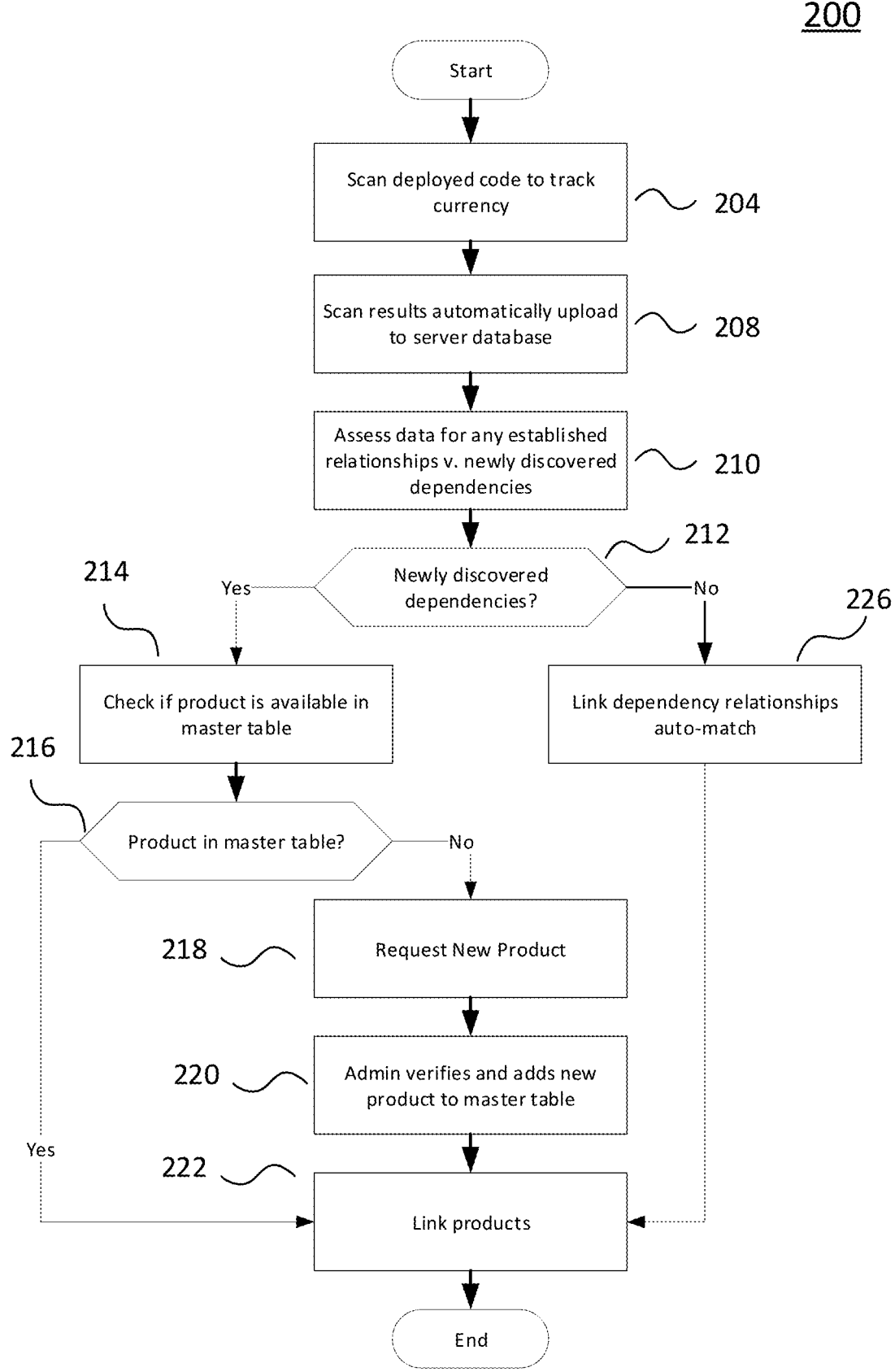
FIG. 2 illustrates steps in a method of a scanning management process according to one aspect of the disclosed technology.

FIG. 2 illustrates other steps in process 200 as they might be performed by the currency management system 112. The steps may be executed by the server(s) 130. For example, at step 204, currency management system 112 may scan deployed code to track currency. At step 208, the currency management system 112 may automatically upload the scan result to database 114. At step 210, the currency management system 112 may assess the uploaded scan result to determine if the uploaded scan result includes any established application relationships or newly discovered application dependencies. For any newly discovered application dependencies as determined at step 212, the currency management system 112 may check if the new application dependency is available in a master table stored in the database 114 at step 214. If the application dependency is not present in the master table as determined at step 216, a request is made to add the new application dependency into the master table at step 218. At step 220, an administrator may verify and add the new application dependency into the master table to be stored in database 114. At step 222, the dependencies may be linked. Similarly, if the application dependency is already present in the master table, then steps 218 and 220 may be avoided. On the other hand, for any established application relationships as determined at step 212, then the currency management system 112 may auto-match linked dependency relationships at step 226.

Figure 3:
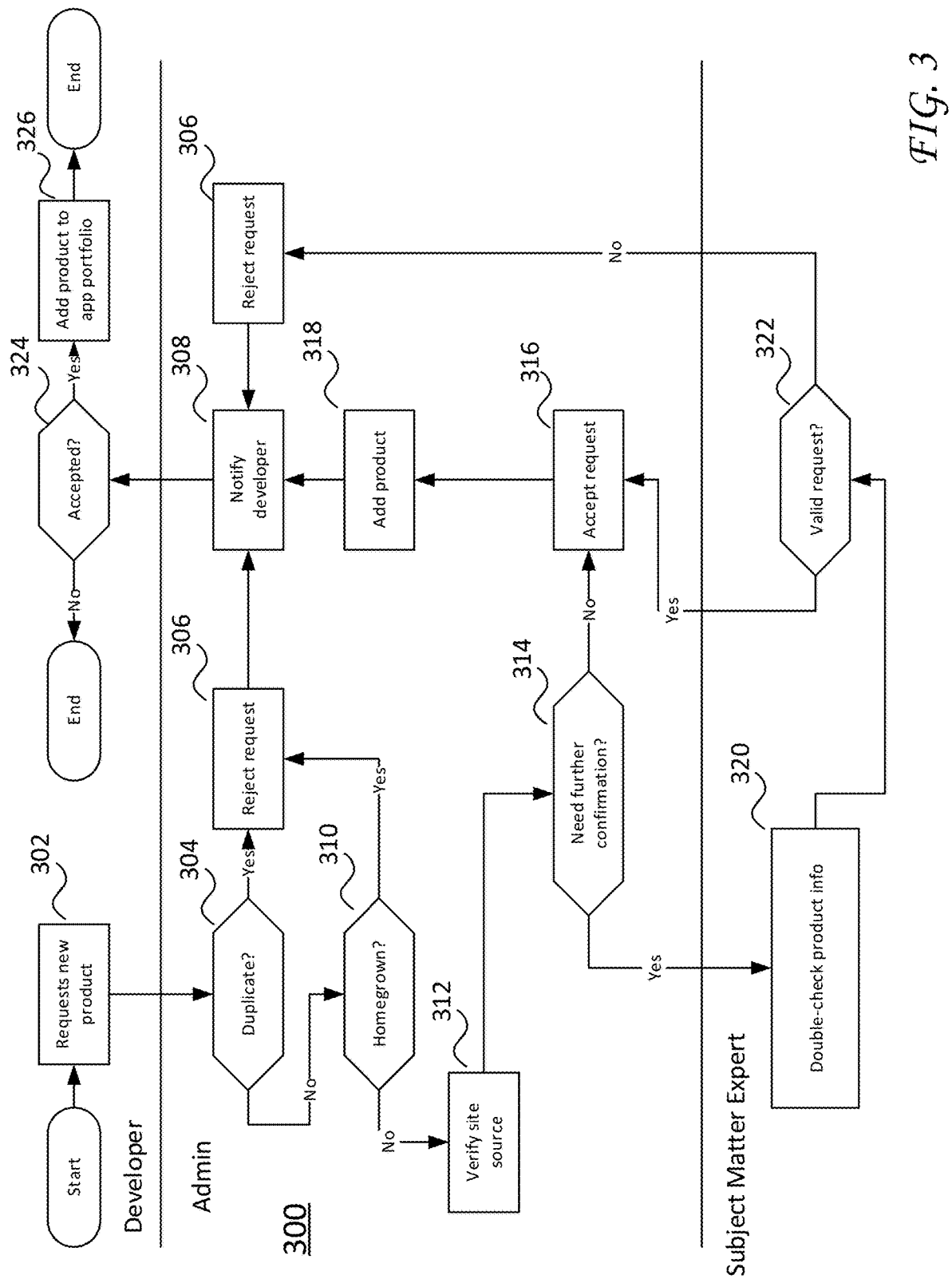
FIG. 3 illustrates steps in a method of a scanning management process according to one aspect of the disclosed technology.

FIG. 3 provides a further example of steps 300 for verifying new application dependency. At step 302, a developer may request a new dependency to be added to the master table of the database 114. At step 304, an administrator may determinate if there is a duplicate entry of the requested dependency existing in the master table. If there exists the duplicate entry, the request is rejected at step 306, and a notification message is sent to the developer at step 308. If there is no duplicate entry, a determination is made as to whether the application dependency is homegrown at step 310. If the application dependency is homegrown, again, the request is rejected at step 306, and a notification message is sent to the developer at step 308. If the application dependency is not homegrown, then a verification is performed as to the site source at step 312. If further confirmation is needed at step 314, then a subject matter expert may double check the dependency information at step 320. If the request to add the new dependency is a valid request at step 322, then the request to add the new dependency is accepted at step 316. Alternatively, if no further confirmation is needed at step 314, then the request to add the new dependency is also accepted at step 316. Next, at step 318, the dependency is added to the master table of database 114. A notification message is then sent to the developer at step 308. The developer at step 324 may determine whether the notification message indicates that the request to add new dependency is accepted or rejected. At step 326, if the notification message indicates that the request is accepted, then the dependency is added to application portfolio. Otherwise, if the notification message indicates that the request is rejected, then the flow process ends.

Figure 4:
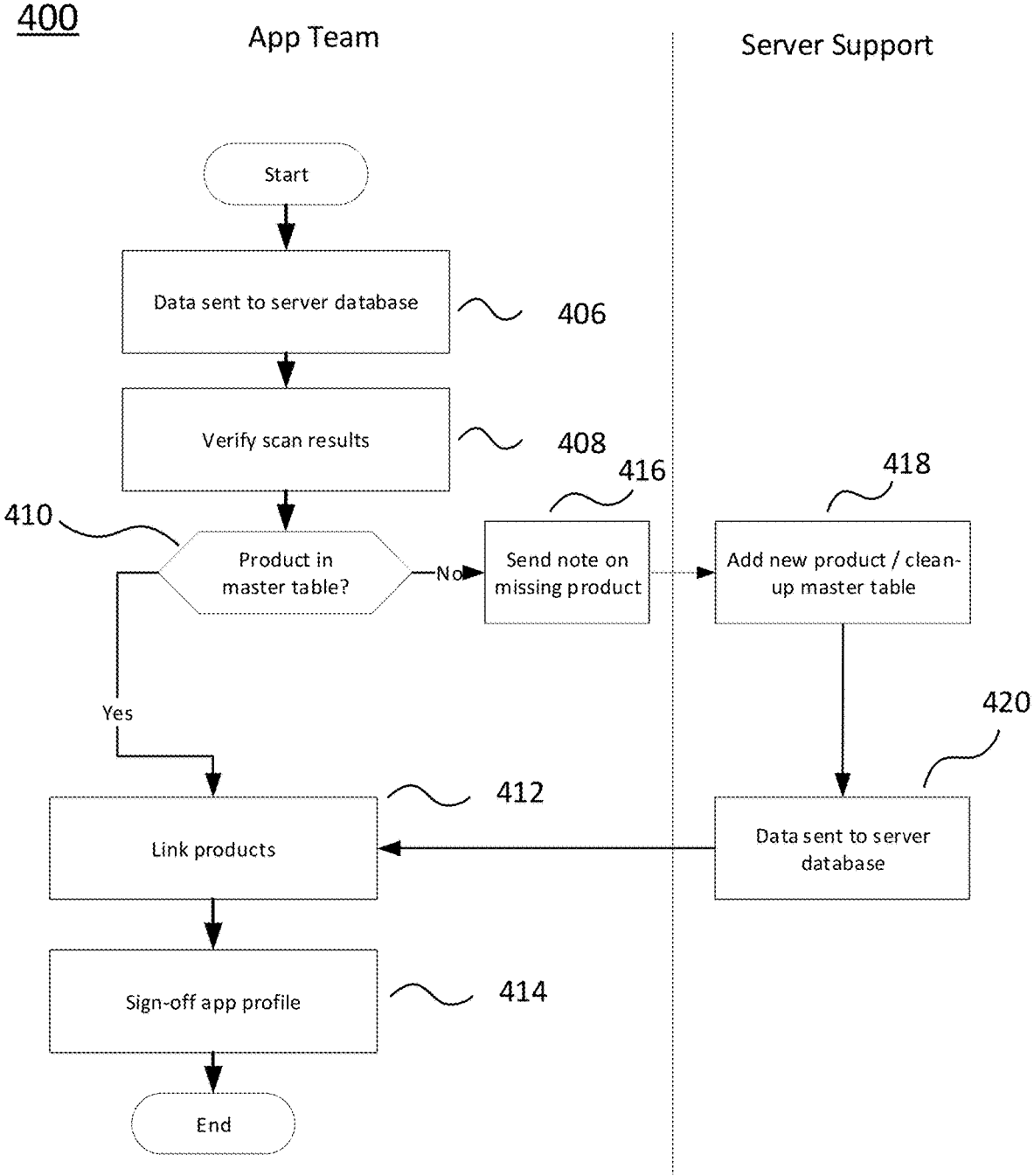
FIG. 4 illustrates steps in a method of a scanning management process according to one aspect of the disclosed technology.

FIG. 4 provides a further example of steps 400 illustrating a scanning cycle. At step 406, currency management system 112 sends data representing the scanning result to the database 114. At step 408, the currency management system 112 may verify the scanning result. At step 410, the currency management system 112 may determine if the application dependency identified in the scanning result exists in the master table stored in database 114. If the application dependency exists in the master table, then at step 412, application dependencies are linked. On the other hand, if the application dependency does not exist in the master table, then at step 416, the user may send a note on the missing application dependency to an administrator. The administrator may at step 418 add the new application dependency to the master table or clean up the master table on database 114. At step 420, data of the new application dependency may be sent to database 114. Then, the application dependencies may be linked at step 412. At step 414, application profile may be signed off. A table historical snapshot may be taken periodically, for example, on a monthly basis.

The currency management system 112 may provide a graphical user interface 134 to display the scan results received from the scanner. The graphical user interface 134 may be available to a user or developer through web access. The graphical user interface 134 may provide a complete picture of application dependencies. The graphical user interface 134 may show a current point-in-time picture of all application dependencies. The graphical user interface 134 may display a blueprint of all application dependencies, including scanned and non-scanned application breakdowns as shown in FIG. 5. Application owners may have accountability to update at each release.

Figures 8, 9:
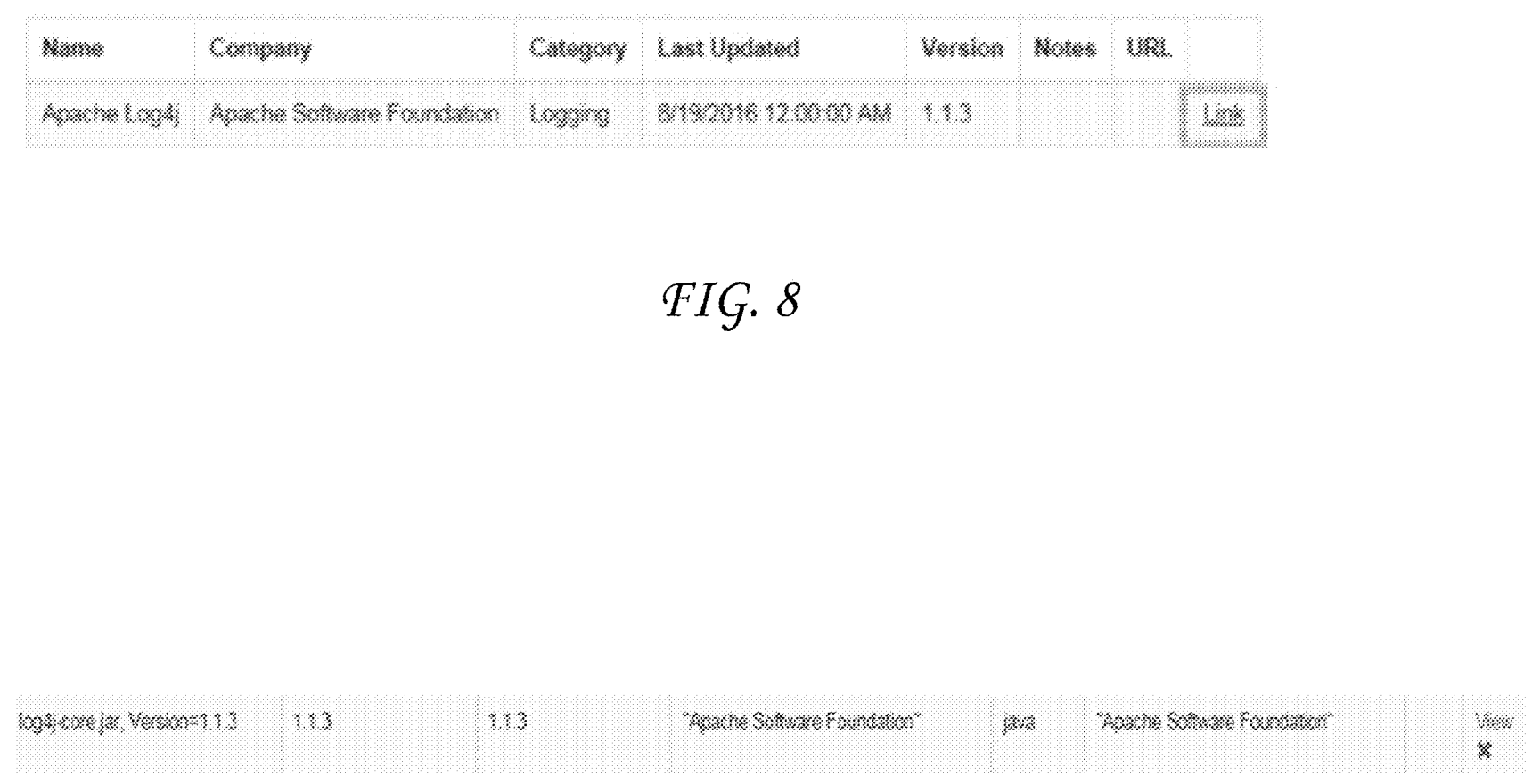

In one example, developers may review the scan results and link relevant components to a master table stored in database 114. The master table may maintain an active record of products across portfolio, unify the portfolio through mapping, and kickstart tracking process that identifies deltas. The currency management system 112 may identify components, products or dependencies from the scan results, and display information with regard to each component, product or dependencies in the graphical user interface 134. FIG. 6 displays information of one example product. If matching is required, a developer may click on the "Match" button displayed in the graphical user interface 134 next to the product information. The developer may be presented with a "Match Dependencies" page with options for selection as shown in FIG. 7. The graphical user interface 134 may also display information for linking as shown in FIG. 8, and for verification by using a "View" button as shown in FIG. 9.

Figure 10:
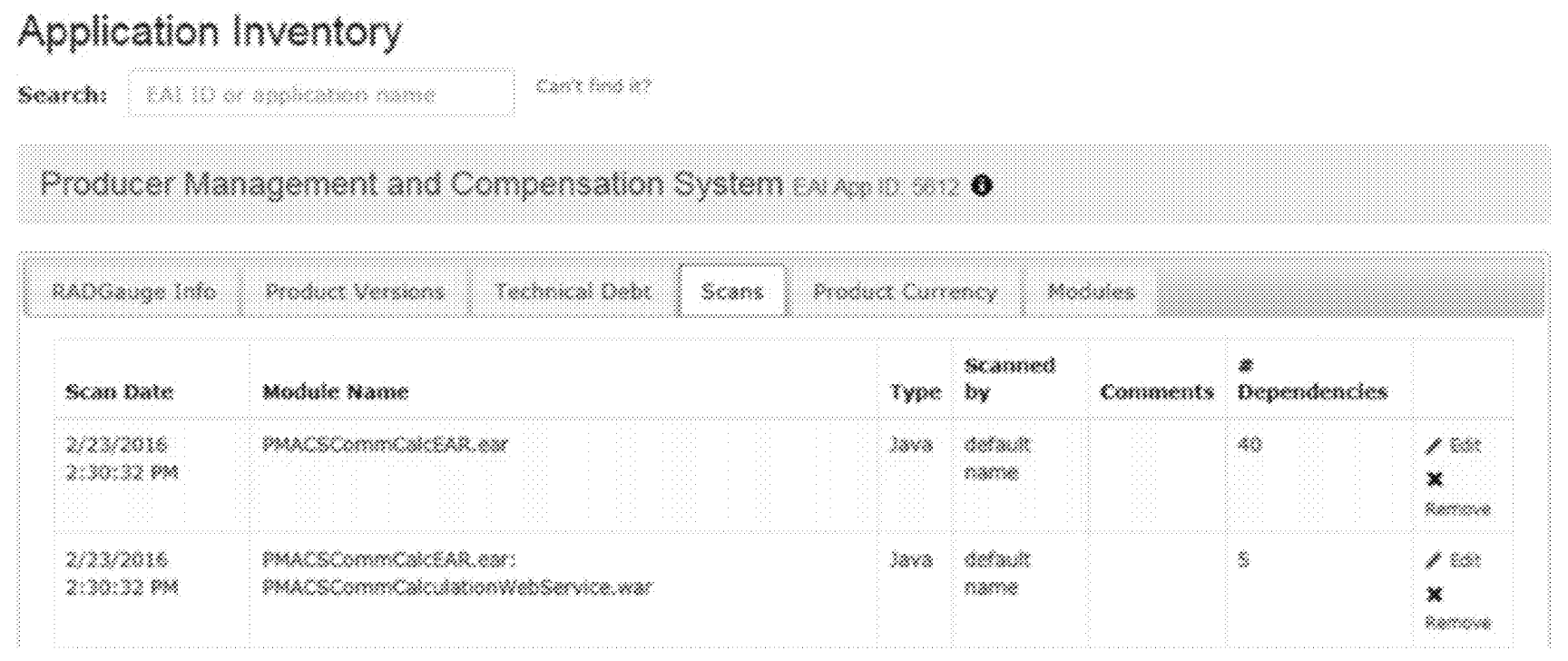

The user may visit the graphical user interface 134 through web access. FIG. 10 displays one example of the graphical user interface 134. The user may confirm accuracy of the scan result as shown in the graphical user interface 134. The user may select a "Scans" tab as illustrated in FIG. 10. The "Scans" tab may show an inventory of and links to all scans that have been performed against a specific application. The user may click the corresponding date for the scan result, and a new tab may open as illustrated in FIG. 11.

Figure 11:
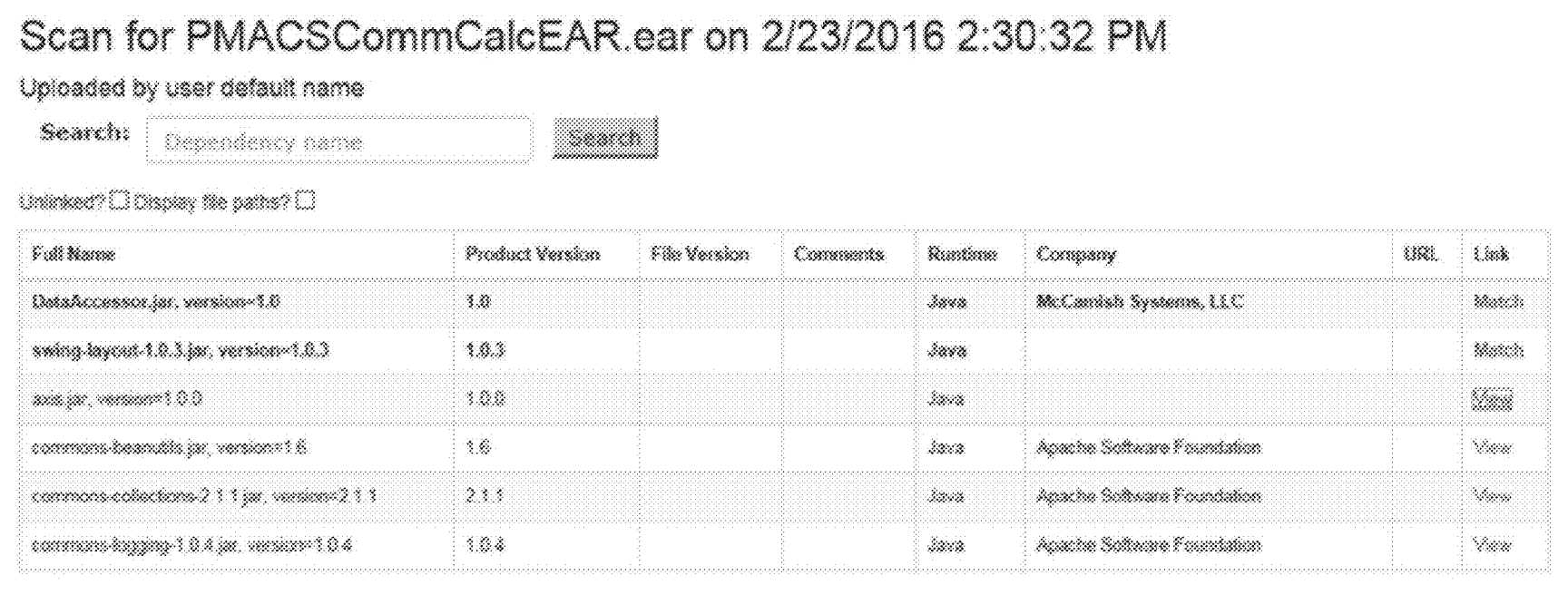
Figure 14:
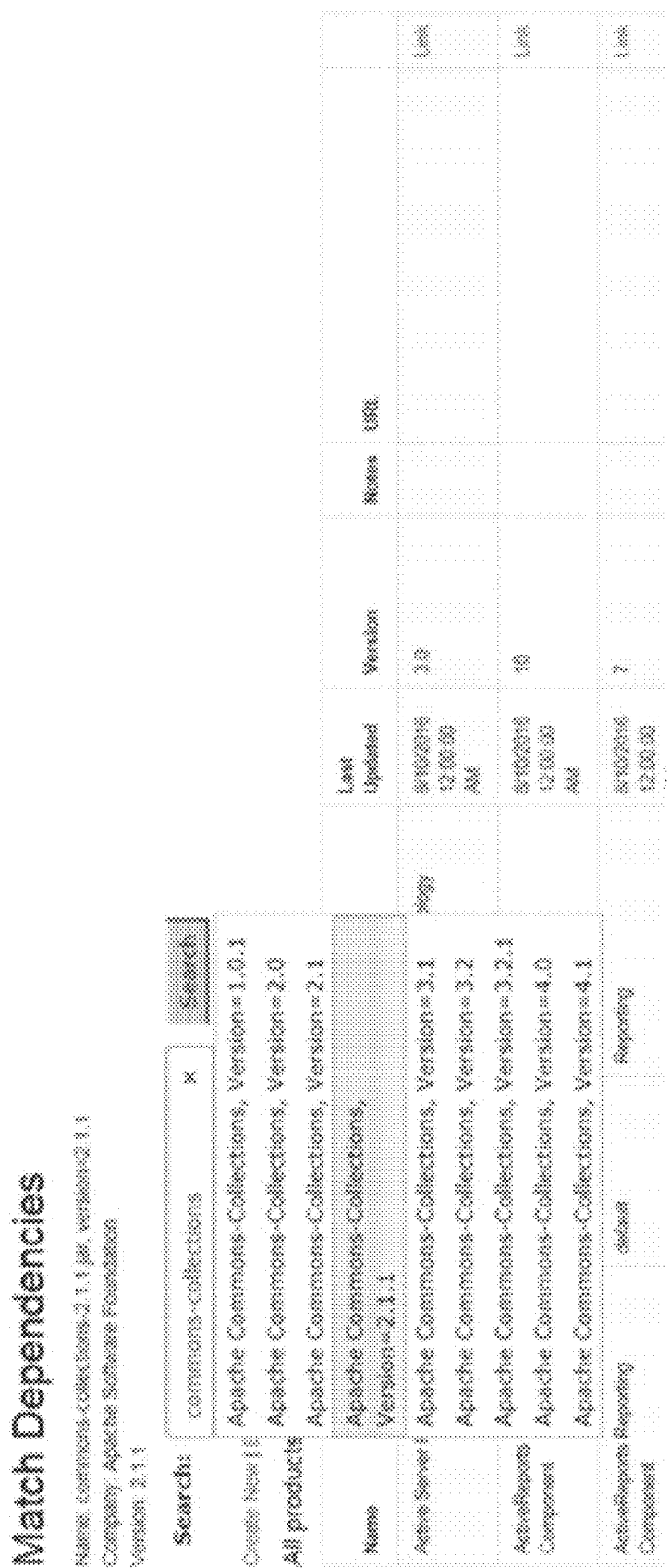
FIG. 14 illustrates search options in the "Match Dependencies" page according to one aspect of the disclosed technology.
Figure 15:
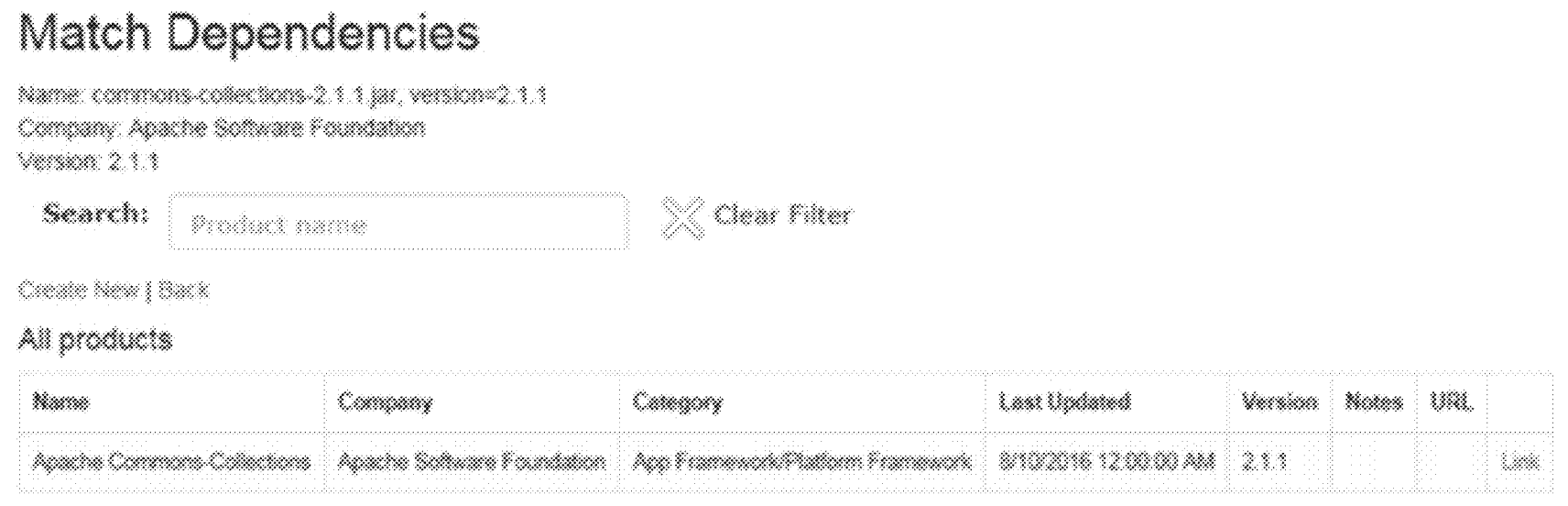

The graphical user interface 134 may display products not linked to the master table or the master product list stored in database 114 in bold, and also display a "Match" button on the right side of the screen for linking purposes as illustrated in FIG. 11. The purpose of linking is to unify the portfolio with common names so that if they've been previously linked, it should find the right mapping going forward. The user may click the "Match" button for the corresponding dependency such as shown in FIG. 12. Once the user clicks the "Match" button, the user may be taken to a product master list for linking as shown in the "Match Dependencies" page presented in FIG. 13. The user may use the search field to narrow down the options as illustrated in FIG. 14. Afterwards, the user may select "Link" to match the dependencies as shown in FIG. 15. Next, the user may double-check and ensure that the correct product is matched by selecting "View" as illustrated in FIG. 16.

Figure 17:
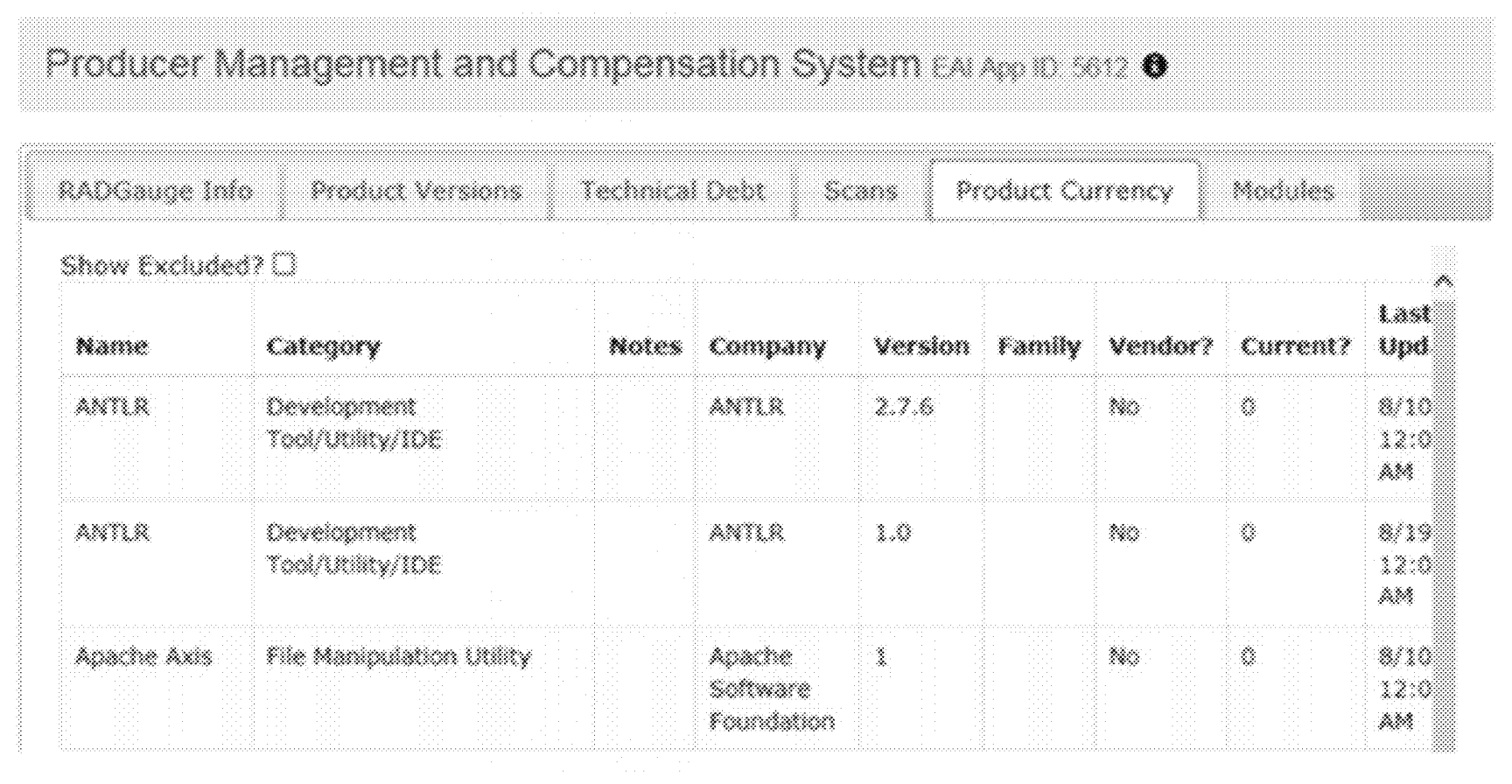
Figure 18:
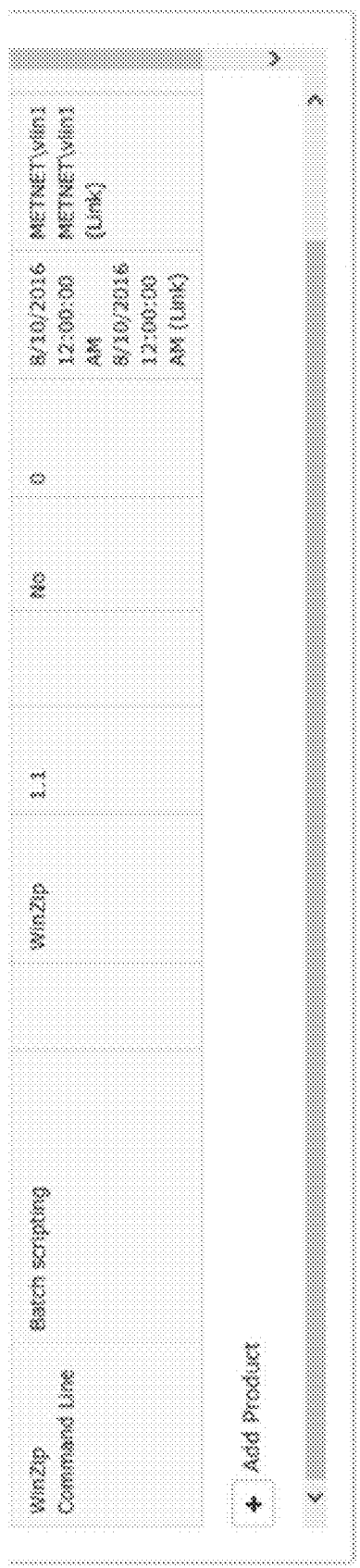
FIG. 18 illustrates an example "Add Product" button in the graphical user interface according to one aspect of the disclosed technology.
Figure 19:
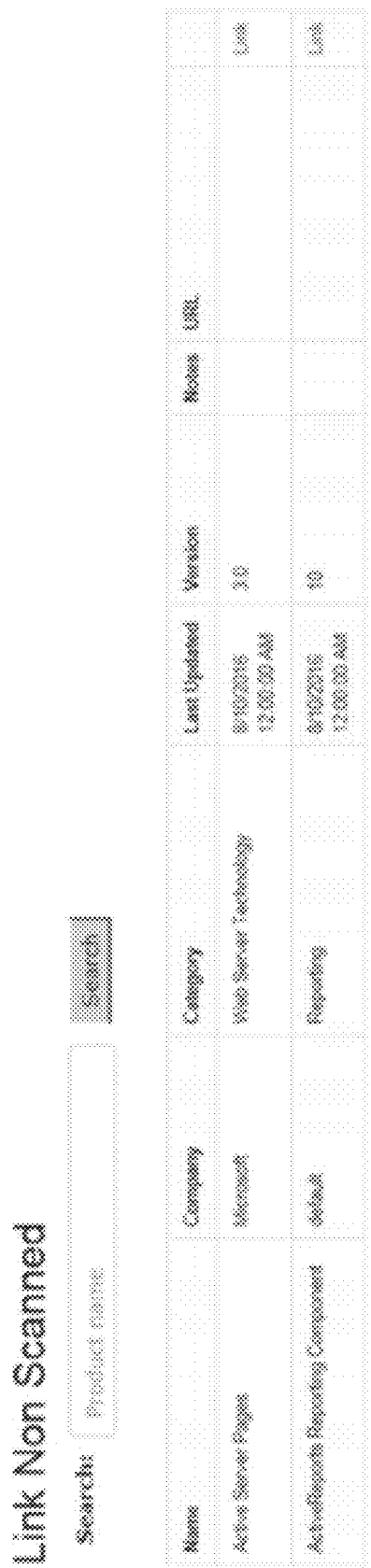
FIG. 19 illustrates a "Link Non Scanned" page in the graphical user interface according to one aspect of the disclosed technology.

As shown in FIG. 17, the user may select a "Product Currency" tab in the graphical user interface 134 to view a breakdown of scanned and non-scanned products within the app. The user may select a "Show Excluded?" checkbox to reveal any products that are in the exclusion list in addition to all the other products. The graphical user interface 134 may display an "Add Product" button at the bottom of the same page as shown in FIG. 18 that allows the user to add any non-scanned products that are missing. When the user clicks the "Add Product" button, the user may be taken to a "Link Non Scanned" page as shown in FIG. 19 similar to "Match Dependencies" to link the non-scanned product. To link the non-scanned product, the user may perform the same procedures described above regarding "Match Dependencies" in connection with FIGS. 13-16.

In the examples provided above, the illustrated components and steps are merely examples. Certain other components and other steps may be included or excluded as desired. Further, while a particular order of the steps is illustrated and executed from the perspective of a particular device or system, this ordering is merely illustrative, and any suitable arrangement of the steps and/or any number of systems, platforms, or devices may be used without departing from the scope of the examples provided herein.

The techniques described herein, therefore, allow a centralized search or scan of application dependencies as reflected in source code, the tracking of application dependencies across different systems, and the ability to quickly identify a particular application dependency, with the ability to prioritize resources for upgrades based on the application dependencies. Priorities for upgrades may also be based on other factors, such as security factors.

While there has been shown and described illustrative examples of a centralized search or scan of application dependencies as reflected in source code, the tracking of application dependencies across different systems, and the ability to quickly identify a particular application dependency, with the ability to prioritize resources for upgrades based on the application dependencies, it is to be understood that various other adaptations and modifications may be made within the spirit and scope of the examples herein. For example, certain functionality has been shown and described herein with relation to certain systems, platforms, hardware, devices, and modules. However, the examples in their broader sense are not as limited, and may, in fact, be employed in virtually any software development, management, or maintenance environment, as well as employed by any combination of devices or components discussed herein.

The foregoing description has been directed to specific examples or embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media, including media that is local and media that is remote, which might be referred to as "the Cloud." Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claim is:
1. A method for managing software application currency, the method comprising:
    receiving a notification that a plurality of software applications within a deployed environment are subject to a security risk;
    identifying a first group of the plurality of software applications as being subject to the security risk;
    identifying a second group of the plurality of software applications as not being subject to the security risk;
    for a first software application of the first group:
        scanning a source code repository corresponding to the first software application within a development environment;

detecting a first dependency corresponding to the first software application as being subject to the security risk based on the scan of the source code repository corresponding to the first software application;
linking the first dependency to the first software application on a master update table within the development environment;
determining a first version and a second version corresponds to the first dependency;
ranking the first version and the second version on the master update table within the development environment based on a first version currency and a second version currency;
prioritizing the first software application for a currency update within the deployed environment, based at least on the ranking of the second version currency being more current than the first version currency;
for a second software application of the first group:
scanning a source code repository corresponding to the second software application within the development environment;
detecting a second dependency corresponding to the second software application as being subject to the security risk based on the scan of the source code repository corresponding to the second software application;
linking the second dependency to the second software application on the master update table within the development environment;
matching the second dependency to the first dependency on the master update table based on a determination that the second dependency and the first dependency are the same dependency;
determining that a third version corresponds to the second dependency;
ranking the third version on the master update table within the development environment based on a third version currency;
determining that the third version currency is less current than the first version currency based on the master update table rankings;
modifying the priority of the currency update from the first software application to the second software application based at least on the third version currency being less current than the first version currency; and
updating, within the deployed environment, the second software application to mitigate the security risk.

2. The method according to claim 1, further comprising:
displaying information representing:
the first software application,
the second software application,
the first version corresponding to the first dependency,
the second version corresponding to the first dependency,
the third version corresponding to the second dependency,
the priority for currency update of the first software application, and
the priority for currency update of the second software application.

3. The method according to claim 1, further comprising:
for the first software application of the first group:
identifying all dependencies based on at least the scan of the source code repository corresponding to the first software application;
determining all versions corresponding to all the dependencies; and
displaying information representing all the versions and all the dependencies.

4. The method according to claim 1, further comprising:
for the first software application of the first group:
identifying a total number of dependencies based on at least the scan of the source code repository corresponding to the first software application; and
displaying information representing the total number of dependencies for the first software application.

5. The method according to claim 1, further comprising:
for the first group of the plurality of software applications:
identifying a total number of software applications having the first version that corresponds to the first dependency; and
displaying information representing the total number of software applications in the first group having the first version that corresponds to the first dependency.

6. The method according to claim 1, further comprising:
for the first group of the plurality of software applications:
identifying a total number of software applications having the first dependency; and
displaying information representing the total number of software applications in the first group having the first dependency.

7. The method according to claim 1, further comprising:
for the first group of the plurality of software applications:
identifying names of all the software applications having the first dependency; and
displaying information representing the names of all the software applications having the first dependency.

8. The method according to claim 1, further comprising:
for the second group of the plurality of software applications:
identifying names of software applications in the second group having the first dependency by using at least source code repositories;
displaying information representing the names of the software applications in the second group having the first dependency; and
displaying an option to change the identification of the software applications in the second group having the first dependency from the second group where they are not subject to the security risk to the first group where they are subject to the security risk.

9. The method according to claim 1, further comprising:
for the second group of the plurality of software applications:
identifying names of software applications in the second group having the first dependency by using at least metadata associated with the software applications in the second group;
displaying information representing the names of the software applications in the second group having the first dependency; and
displaying an option to change the identification of the software applications in the second group having the first dependency from the second group where they are not subject to the security risk to the first group where they are subject to the security risk.

10. The method according to claim 1, further comprising:
for a third software application that is not in either the first group or the second group:
identifying third dependencies of the third software application based on at least a scan of a source code repository corresponding to the third software application;

determining that the first dependency corresponds to one of the third dependencies; and displaying information representing the third dependencies and respective versions.

11. A system for managing software application currency, comprising:

a network interface to communication in a network;

a processor coupled to the network interface and adapted to execute one or more processes; and a memory configured to store a process executable by the processor, the process, when executed, is operable to:

receive a notification that a plurality of software applications within a deployed environment are subject to a security risk;

identify a first group of the plurality of software applications as being subject to the security risk;

identify a second group of the plurality of software applications as not being subject to the security risk;

for a first software application of the first group:

scan a source code repository corresponding to the first software application within a development environment;

detect a first dependency corresponding to the first software application as being subject to the security risk based on the scan of the source code repository corresponding to the first software application;

link the first dependency to the first software application on a master update table within the development environment;

determine a first version and a second version corresponds to the first dependency;

rank the first version and the second version on the master update table within the development environment based on a first version currency and a second version currency;

prioritize the first software application for a currency update within the deployed environment, based at least on the ranking of the second version currency being more current than the first version currency;

for a second software application of the first group:

scan a source code repository corresponding to the second software application within a development environment;

detect a second dependency corresponding to the second software application as being subject to the security risk based on the scan of the source code repository corresponding to the second software application;

link the second dependency to the second software application on the master update table within the development environment;

match the second dependency to the first dependency on the master update table based on a determination that the second dependency and the first dependency are the same dependency;

determine that a third version corresponds to the second dependency;

rank the third version on the master update table within the development environment based on a currency of the third version;

determine that the third version currency is less current than the first version currency based on the master update table rankings;

modify the priority of the currency update from the first software application to the second software application based at least on the third version currency being less current than the first version currency; and update, within the deployed environment, the second software application to mitigate the security risk.

12. The system of claim 11, wherein the process, when executed, is further operable to:

display information representing:

the first software application, the second software application, the first version corresponding to the first dependency, the second version corresponding to the first dependency, the third version corresponding to the second dependency, the priority for currency update of the first software application, and the priority for currency update of the second software application.

13. The system of claim 11, wherein the process, when executed, is further operable to:

for the first software application of the first group:

identify all dependencies based on at least the scan of the source code repository corresponding to the first software application;

determine all versions corresponding to all the dependencies; and display information representing all the versions and all the dependencies.

14. The system of claim 11, wherein the process, when executed, is further operable to:

for the first software application of the first group:

identify a total number of dependencies based on at least the scan of the source code repository corresponding to the first software application; and display information representing the total number of dependencies for the first software application.

15. The system of claim 11, wherein the process, when executed, is further operable to:

for the first group of the plurality of software applications:

identify a total number of software applications having the first version that corresponds to the first dependency; and display information representing the total number of software applications in the first group having the first version that corresponds to the first dependency.

16. The system of claim 11, wherein the process, when executed, is further operable to:

for the first group of the plurality of software applications:

identify a total number of software applications having the first dependency; and display information representing the total number of software applications in the first group having the first dependency.

17. The system of claim 11, wherein the process, when executed, is further operable to:

for the first group of the plurality of software applications:

identify names of all the software applications having the first dependency; and display information representing the names of all the software applications having the first dependency.

18. The system of claim 11, wherein the process, when executed, is further operable to:

for the second group of the plurality of software applications:

identify names of software applications in the second group having the first dependency by using at least source code repositories;

display information representing the names of the software applications in the second group having the first dependency; and display an option to change identification of the software applications in the second group having the first dependency from the second group where they are not subject to the security risk to the first group where they are subject to the security risk.

* * * * *